United States Patent [19]
Podkowa

[11] Patent Number: 5,333,295
[45] Date of Patent: Jul. 26, 1994

[54] MEMORY CONTROL SYSTEM

[75] Inventor: William J. Podkowa, Plano, Tex.

[73] Assignee: Dallas Semiconductor Corp., Dallas, Tex.

[21] Appl. No.: 684,684

[22] Filed: Apr. 11, 1991

[51] Int. Cl.⁵ .................................... G06F 13/00
[52] U.S. Cl. ..................... 395/425; 364/DIG. 1
[58] Field of Search ... 364/200 MS File, 900 MS File; 395/400 MS File, 425 MS File

[56] References Cited

U.S. PATENT DOCUMENTS

| | | | |
|---|---|---|---|
| 4,088,990 | 5/1978 | Sass | 340/324 |
| 4,386,423 | 5/1983 | Sasaki et al. | 368/73 |
| 4,427,299 | 1/1984 | Hasegawa | 368/73 |
| 4,450,524 | 5/1984 | Oberman | 395/425 |
| 4,701,858 | 10/1987 | Stokes et al. | 364/483 |
| 4,852,030 | 7/1989 | Munday | 364/569 |
| 4,930,100 | 5/1990 | Morinaga et al. | 395/275 |

*Primary Examiner*—Reba I. Elmore
*Attorney, Agent, or Firm*—Worsham, Forsythe, Sampels & Wooldridge

[57] ABSTRACT

Preferred embodiments have an external RAM controlled by logic on an internal RAM with overlapping address space. Read requests from addresses in the overlapping portion are directed to internal RAM only by controlling the output enable signal of external RAM; contrarily, writes to addresses in the overlapping portion proceed in both internal and external RAM simultaneously.

20 Claims, 15 Drawing Sheets

| ADDRESS | BIT 7 | | | | | | | BIT 0 | RANGE |
|---|---|---|---|---|---|---|---|---|---|
| 0 | 0.1 SECONDS ||||| 0.01 SECONDS |||| 00-99 |
| 1 | 0 | 10 SECONDS |||| SECONDS |||| 00-59 |
| 2 | 0 | 10 MINUTES |||| MINUTES |||| 00-59 |
| 3 | M | 10 MIN. ALARM |||| MIN ALARM |||| 00-59 |
| 4 | 0 | 12/24 | 10 A/P | 10 HR | HOURS ||||| 01-12+AP / 00-23 |
| 5 | M | 12/24 | 10 A/P | 10 HR | HR ALARM ||||| 01-12+AP / 00-23 |
| 6 | 0 | 0 | 0 | 0 | 0 | DAYS |||| 01-07 |
| 7 | M | 0 | 0 | 0 | 0 | DAY ALARM |||| 01-07 |
| 8 | 0 | 0 | 10 DATE ||| DATE |||| 01-31 |
| 9 | $\overline{EOSC}$ | $\overline{ESQW}$ | 0 | 10MO | MONTHS ||||| 01-12 |
| A | 10 YEARS ||||| YEARS |||| 00-99 |
| B | TE | IPSW | IBH LO | PU LVL | WAM | TDM | WAF | TDF | |
| C | 0.1 SECONDS ||||| 0.01 SECONDS |||| 00-99 |
| D | 10 SECONDS ||||| SECONDS |||| 00-99 |
| E | |||||||| |
| 1FFFF | |||||||| |

CLOCK, CALENDAR, TIME OF DAY ALARM REGISTERS: rows 0-A

COMMAND REGISTERS: row B

WATCHDOG ALARM REGISTERS: rows C-D

USER REGISTERS: rows E-1FFFF (RETRIGGERABLE/REPETITIVE COUNTDOWN ALARM)

*FIG. 2*

| MINUTES | HOURS | DAYS | |
|---|---|---|---|
| 1 | 1 | 1 | ALARM ONCE PER MINUTE |
| 0 | 1 | 1 | ALARM WHEN MINUTES MATCH |
| 0 | 0 | 1 | ALARM WHEN HOURS AND MINUTES MATCH |
| 0 | 0 | 0 | ALARM WHEN HOURS, MINUTES, AND DAYS MATCH |

NOTE: ANY OTHER COMBINATIONS OF MASK BIT SETTINGS PRODUCE ILLOGICAL OPERATION.

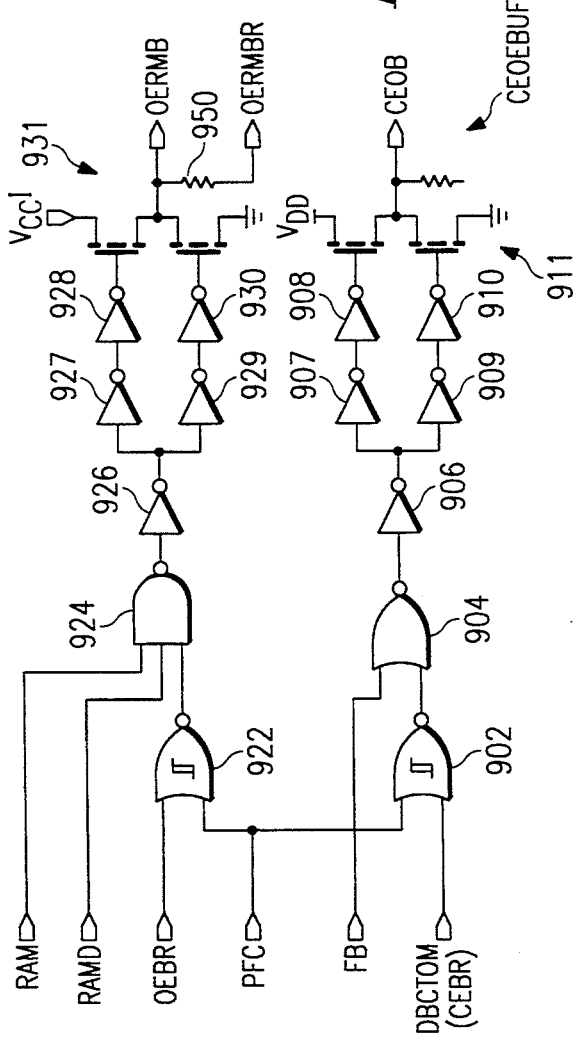
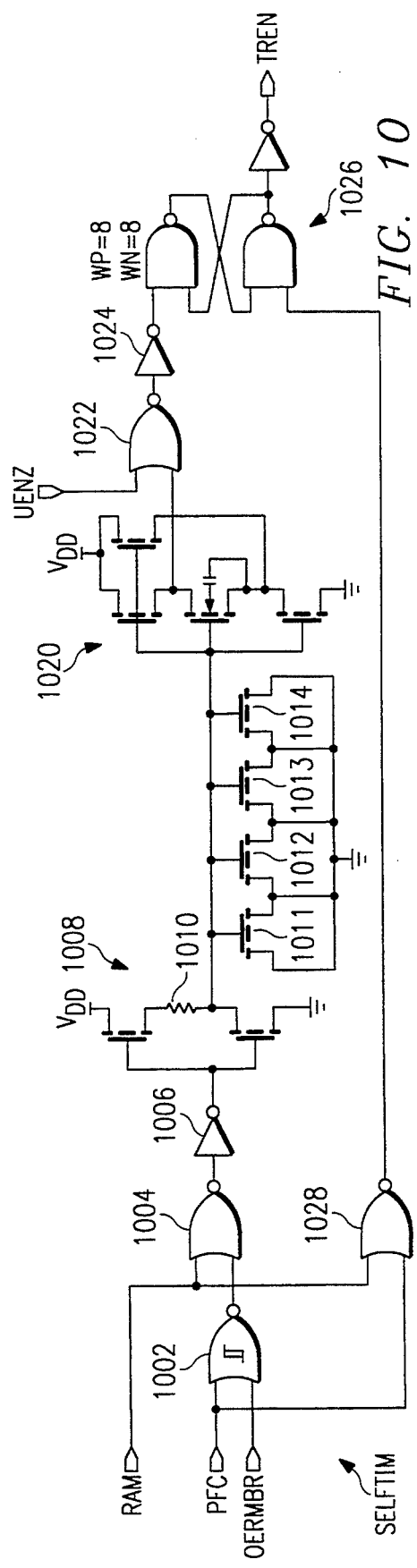
FIG. 9
FIG. 10

MEMORY CONTROL SYSTEM

PARTIAL WAIVER OF COPYRIGHT PURSUANT TO 1077 O.G. 22

All of the material in this patent application is subject to copyright protection under the copyright laws of the United States and of other countries. As of the first effective filing date of the present application, this material is protected as unpublished material.

Portions of the material in the specification and drawings of this patent application are also subject to protection under the maskwork registration laws of the United States and of other countries.

However, permission to copy this material is hereby granted to the extent that the owner of the copyright and maskwork rights has no objection to the facsimile reproduction by anyone of the patent document or patent disclosure, as it appears in the United States Patent and Trademark Office patent file or records, but otherwise reserves all copyright and maskwork rights whatsoever.

CROSS-REFERENCE TO RELATED APPLICATIONS

The following copending U.S. patent application discloses related subject matter: Ser. No. 07/618,433, filed on Nov. 27, 1990. This cross-referenced application has an assignee in common with the present application.

BACKGROUND AND SUMMARY OF THE INVENTION

The present invention relates to electronic devices, and, more particularly, to semiconductor devices useful with memory devices.

Computers frequently include a timekeeping function that keeps track of the time of day, day, month, and year for various uses. Such timekeeping function will typically be implemented in specific hardware with a dedicated crystal oscillator to insure accuracy and a battery backup power supply to insure preservation of timekeeping data during an interruption of the primary power supply. This is especially important with personal computers which are not infrequently powered down.

In addition to timekeeping data, computers often also contain data in main memory that preferably would not be lost upon power interruption. Thus devices such as the DS1287 Real Time Clock manufactured by Dallas Semiconductor Corp. provide a single chip that includes both a timekeeping function with battery backup and crystal oscillator plus 50 bytes of nonvolatile general purpose RAM. The DS1287 is designed to fit into an IBM AT type personal computer and other such machines. Of course, larger nonvolatile RAM would be more desirable, and such a timekeeping plus RAM circuit must be very low power to provide long battery lifetime. However, merely attaching an external RAM to a device such as the DS1287 gives rise to a problem of complicated memory mapping which detracts from the simplicity of attachment of external RAM.

The present invention provides a clock with on chip RAM plus address control for the direct attachment of external RAM with continguous address mapping.

BRIEF DESCRIPTION OF THE DRAWINGS

The drawings are schematic for clarity.

FIG. 2 illustrates the on chip RAM of the first preferred embodiment;

FIGS. 6 through 10 are schematic circuit diagrams of the blocks of FIGS. 5a, 5b, 5c, and 5d;

DESCRIPTION OF THE PREFERRED EMBODIMENTS

Figure 1A:
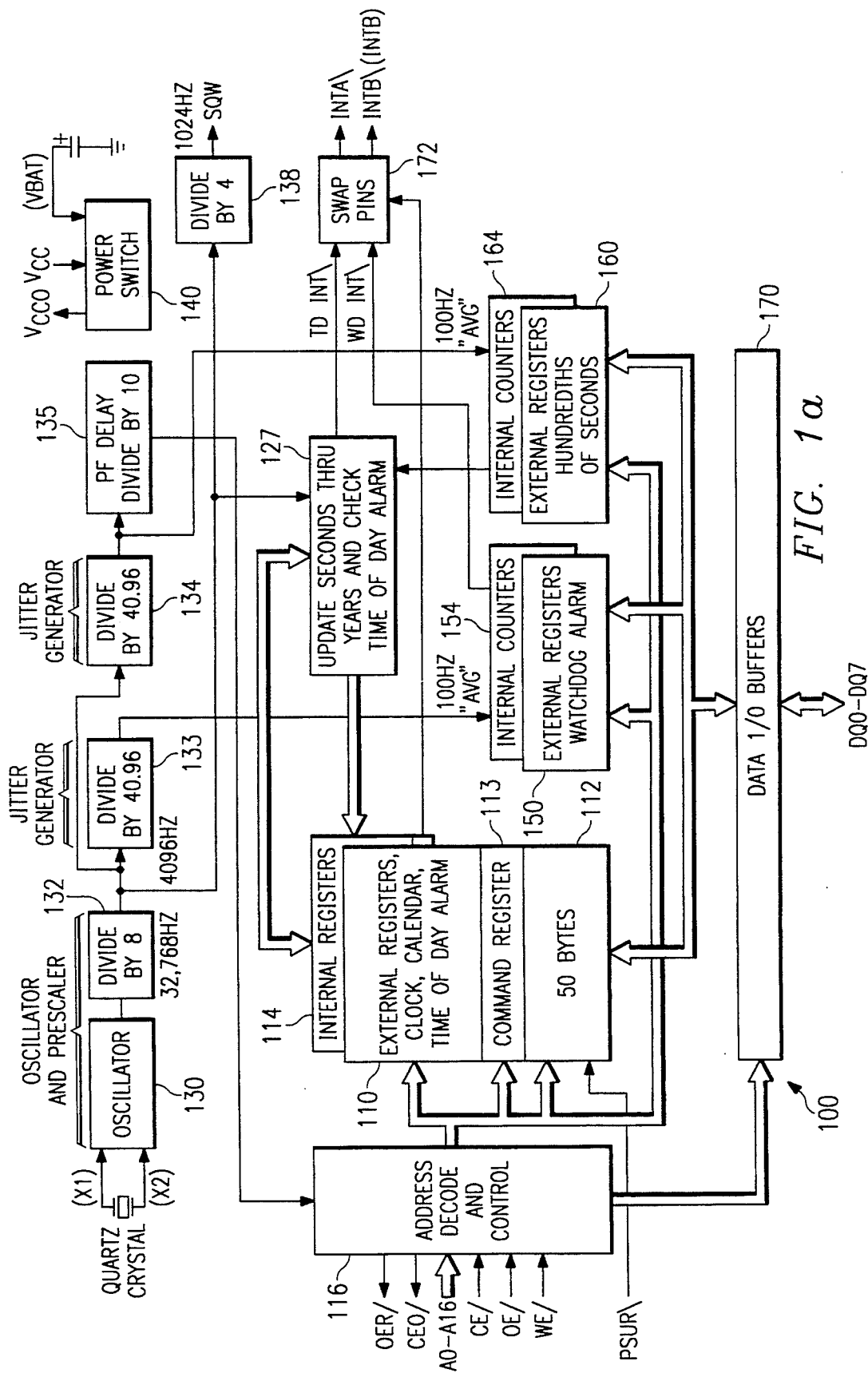
FIG. 1a is a functional block diagram of a first preferred embodiment.

FIG. 1a is a functional block diagram of a first preferred embodiment clock memory, generally denoted by reference numeral 100, which includes a first preferred embodiment address map. Clock memory 100 is a silicon integrated circuit and shown to include battery terminal VBAT and oscillator crystal terminals X1 and X2, although a battery and a crystal could be packaged with Clock memory 100 or separately as shown in application FIG. 1b. Clock memory 100 includes 14 bytes of on chip RAM 110, 113, 150, 160 (addresses 00 through 0D expressed in hexadecimal) for storing timekeeping data, a command byte, and alarm data, plus 50 bytes of general purpose on chip RAM 112 (addresses 0E through 3F), and addressing decision circuitry for 17-bit addresses A0–A16 (00000 through 1FFFF) for a 128 Kbit external RAM 104 that may be attached, as appears in application FIG. 1b. Address decode and control 116 decodes addresses for access to RAMs 110, 112, 113, 150, and 160 plus activates the external RAM 104 for addresses from 00040 through 1FFFF. This includes the first preferred embodiment address map. Other portions of Clock memory 100 are clock/calendar updater 127, crystal oscillator 130, dividers 132–135, square wave generator 138, external power voltage sensor and switch 140, RAMs 114, 154, and 164 that are internal portions of RAMs 110, 150, and 160 and are used for updating date, time, and alarm data so that update and access may occur simultaneously, data input/output buffers 170 for 8-bit data DQ0–DQ7, interrupts INTA and INTB output control 172, and internal busses. The operation of Clock memory 100 is as follows.

The real time clock begins with oscillator 130 generating a 32.768 KHz square wave which is divided by 8 in divider 132, by a further 40.96 in divider 133, and another alternative 40.96 in divider 134 to output a square wave of average frequency 100 Hz to internal RAM portions 154 and 164. Clock/calendar updater 127 increments the timekeeping data stored in RAM 110, 114 once every second upon a signal from RAM 164 allowing the 4096 Hz signal from divider 132 to clock updater 127 through the update cycle.

The RAM 112 and RAM 113 are essentially independent of the real time clock. Indeed, RAMs 110, 112, 113, 150, and 160 may all be read during the updating of the timekeeping data in RAM 110. The following paragraphs describe the operation in more detail.

DESCRIPTION

Clock memory 100 is a real time clock, alarm, watchdog timer, and interval timer with on chip RAM plus address control for attachment of external RAM. The Clock memory 100 optionally may contain an embedded lithium energy source and a quartz crystal which eliminates the need for any external circuitry. Data contained within 64 8-bit registers (byte addresses 00 through 3F) can be read or written in the same manner as bytewide static RAM, and data contained within external 128K bytes (byte addresses 00000 through 1FFFF) include addresses which overlap with the on chip 64 bytes and the nonoverlapping part is addressed in the same manner. Data is maintained in Clock memory 100 by intelligent control circuitry which detects the status of Vcc when Vcc is out of tolerance. A lithium energy source can maintain data and real time for over ten years in the absence of Vcc. Clock memory 100 information includes hundredths of seconds, seconds, minutes, hours, day, date, month, and year. The date at the end of the month is automatically adjusted for months with less than 31 days, including correction for leap year. Clock memory 100 operates in either 24 hour or 12 hour format with an AM/PM indicator. The watchdog timer provides alarm windows and interval timing between 0.01 seconds and 99.99 seconds. The real time alarm provides for preset times of up to one week.

OPERATION-READ REGISTERS

Figure 1B:
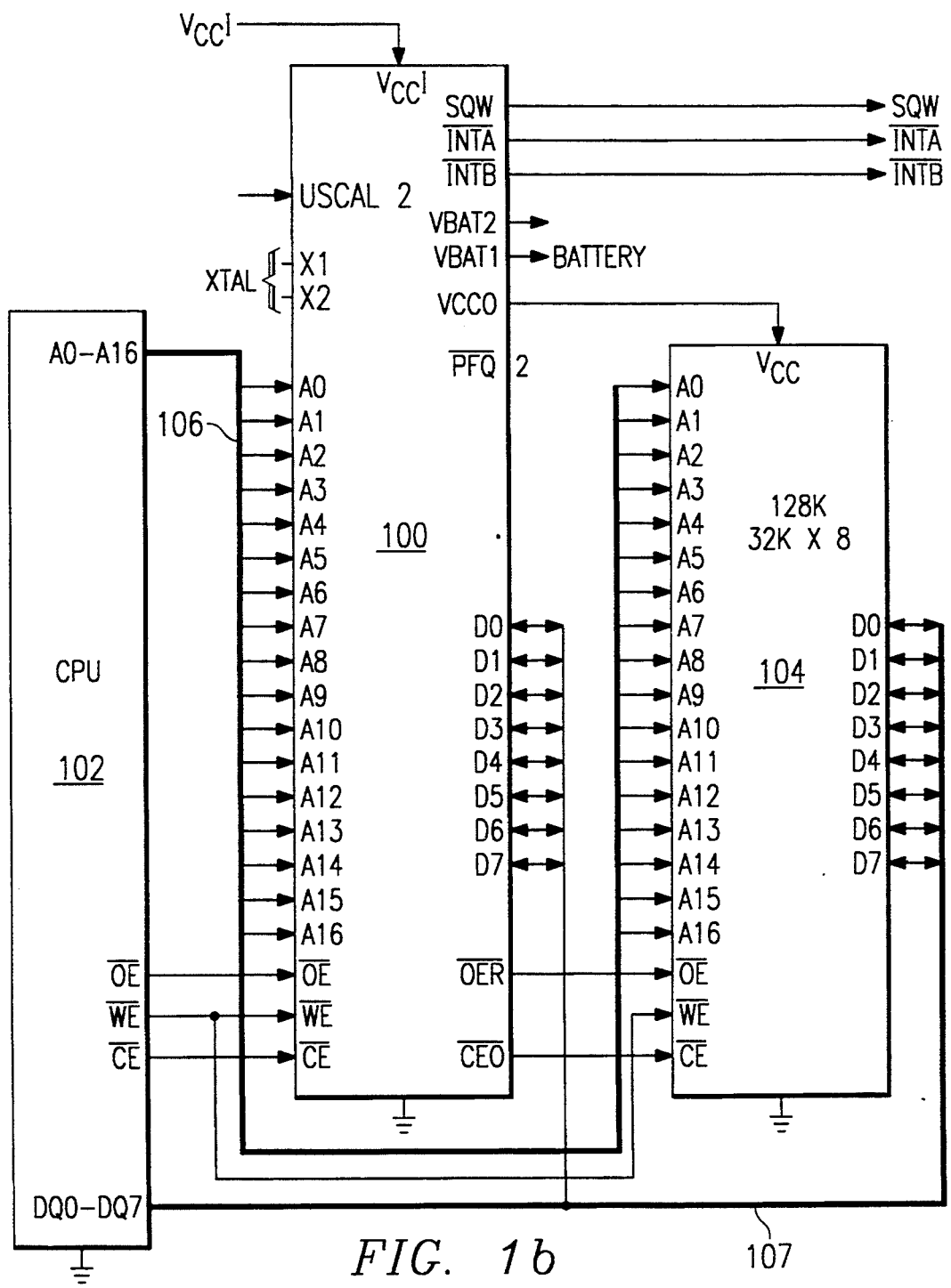
FIG. 1b illustrates an application of the first preferred embodiment.

Clock memory 100 executes a read cycle whenever WE (Write Enable) is inactive (High) and CE (Chip Enable) and OE (Output Enable) are active (Low). The unique address specified by the six address inputs (A0–A5) defines which of the 64 registers is to be accessed. Valid data will be available to the eight data output drivers 170 within $t_{ACC}$ (Access Time) after the last address input signal is stable, providing that CE and OE access times are also satisfied. If OE and CE access times are not satisfied, then data access must be measured from the latter occurring signal (CE or OE) and the limiting parameter is either $t_{CO}$ for CE or $t_{OE}$ for OE rather than address access. See FIG. 4a. The addressing of the 128K byte external RAM 104 shown in FIG. 1b is considered below.

OPERATION-WRITE REGISTERS

Figure 4B:
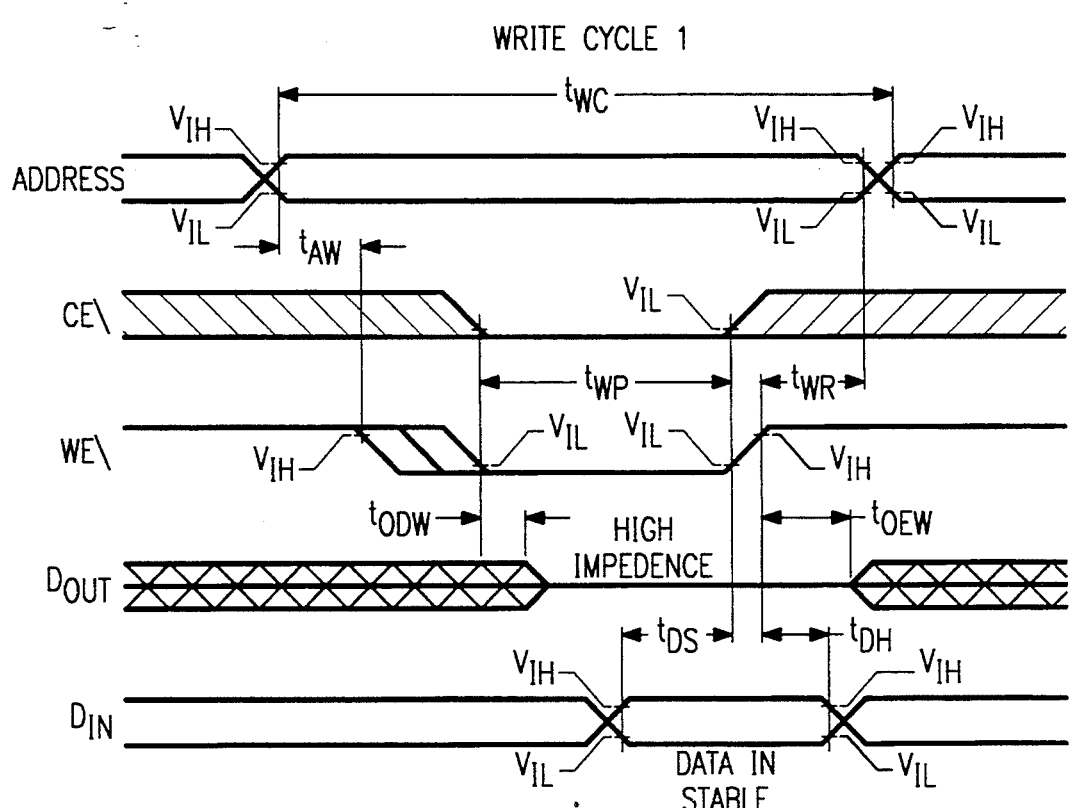
Figure 4C:
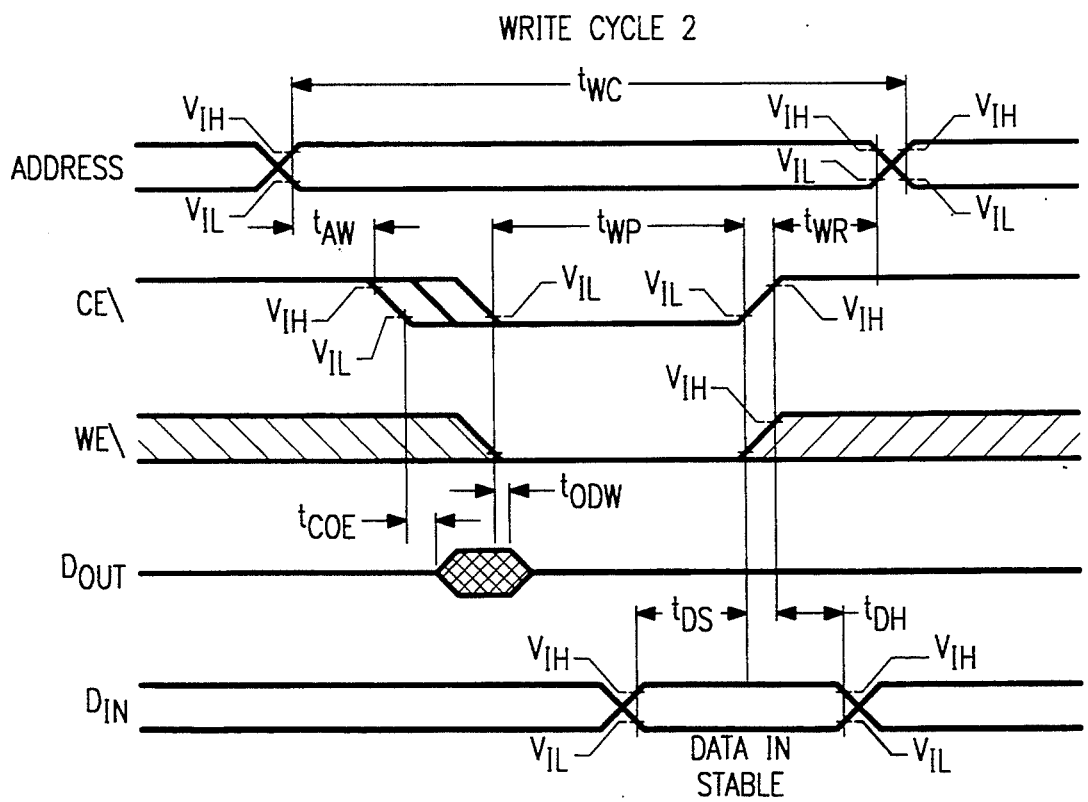
Figure 5A:
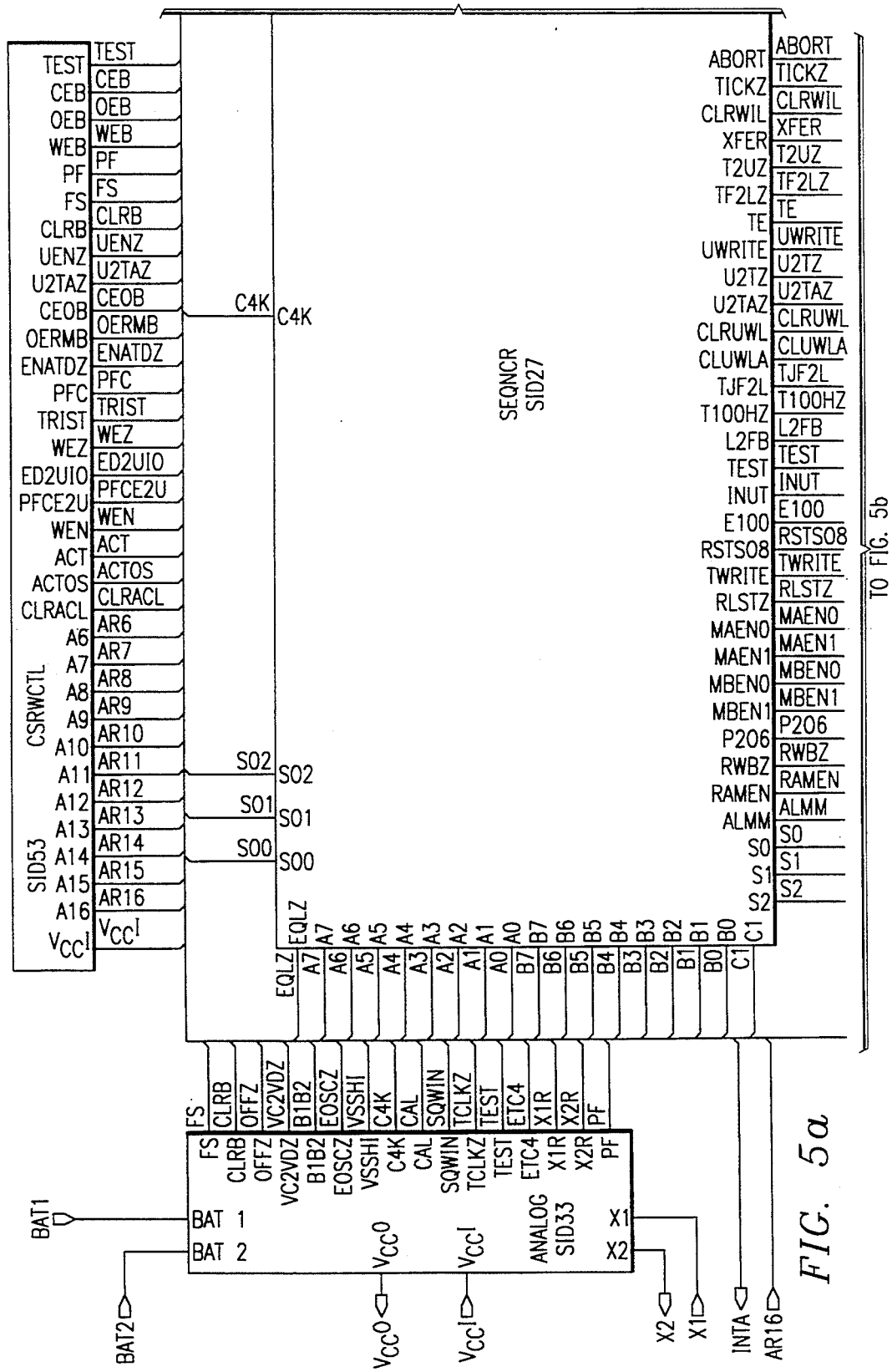
FIGS. 5a, 5b, 5c, and 5d are structural block diagrams of the first preferred embodiment.
Figure 5B:
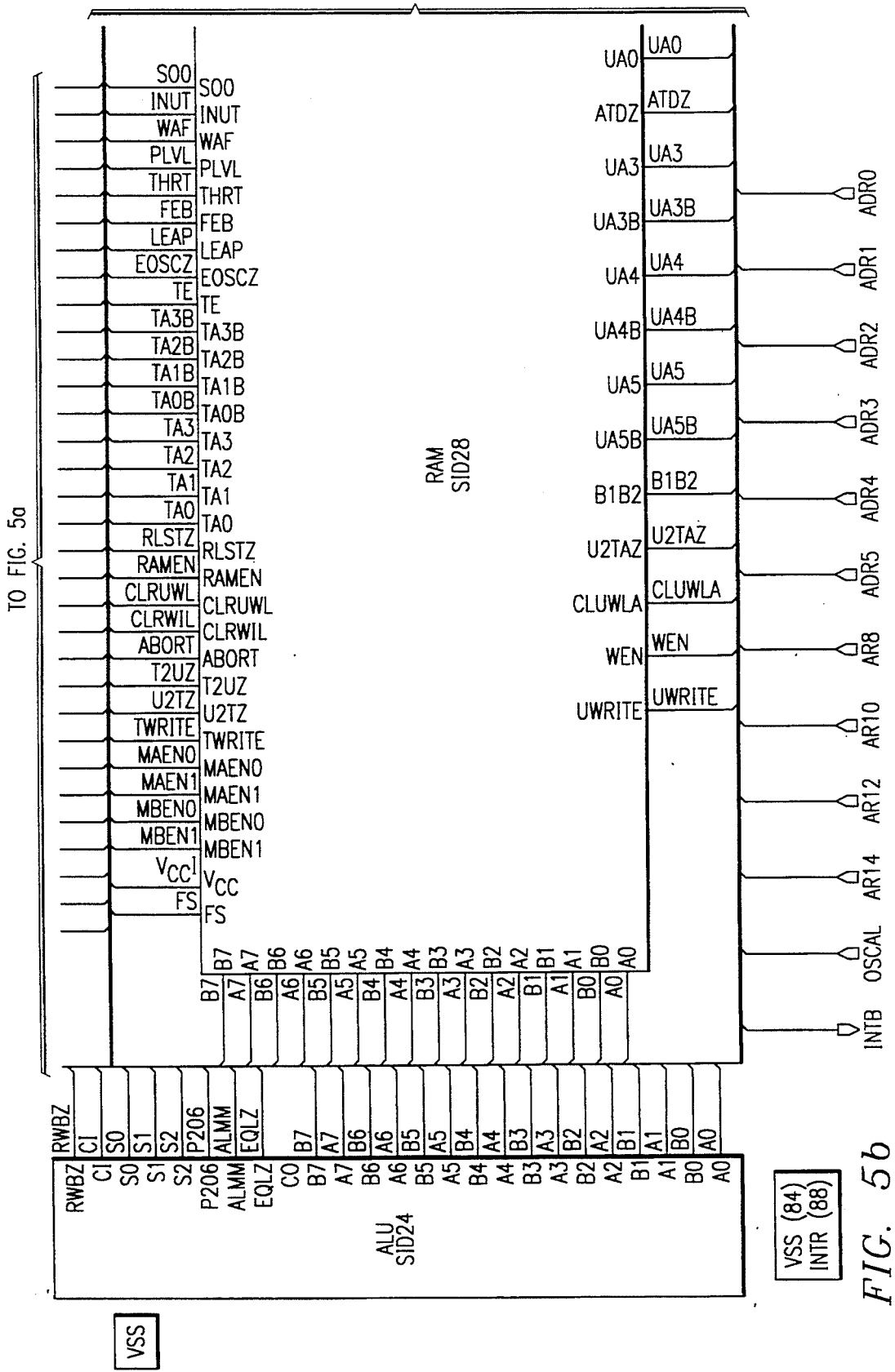
Figure 5C:
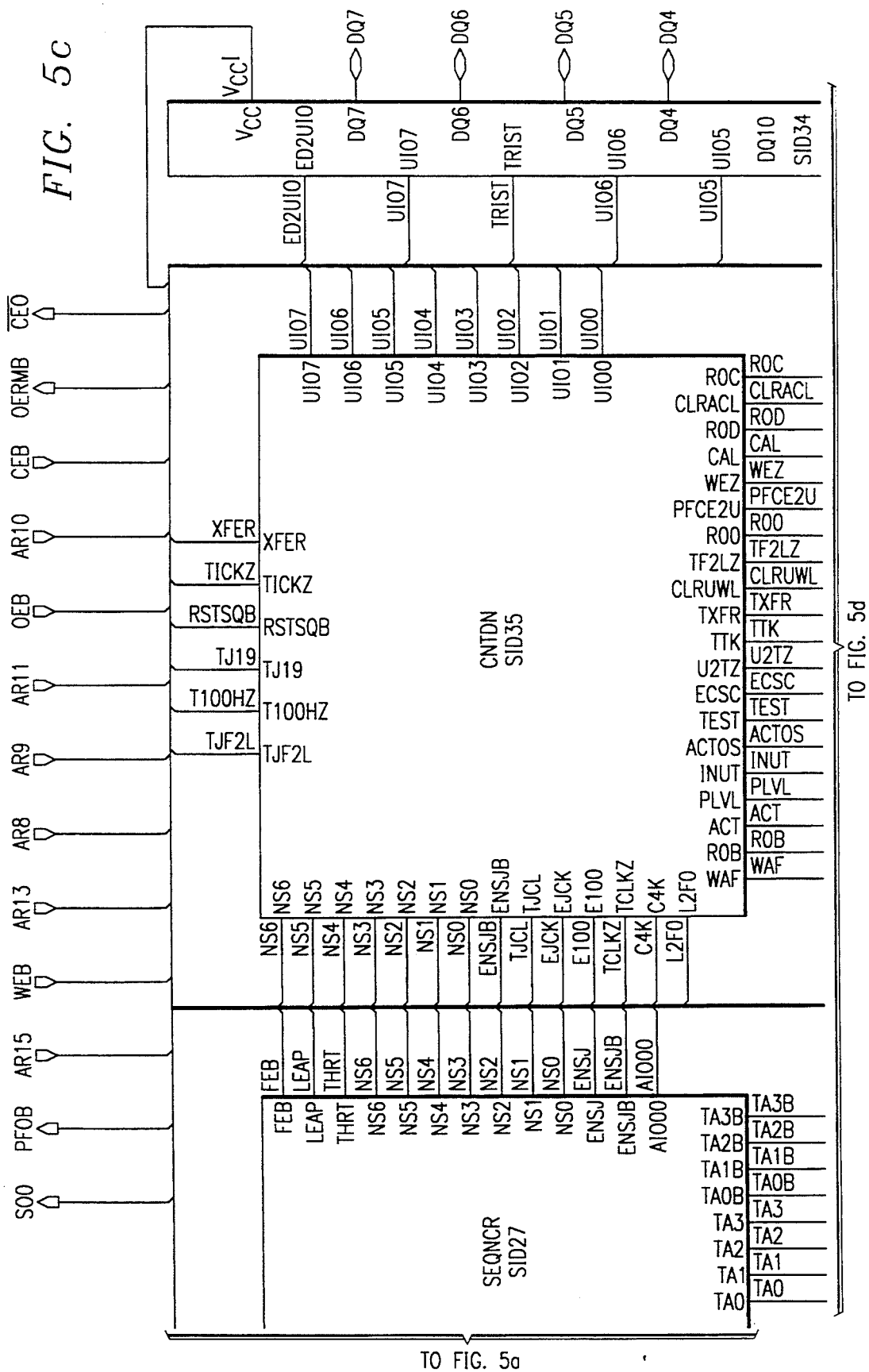
Figure 5D:
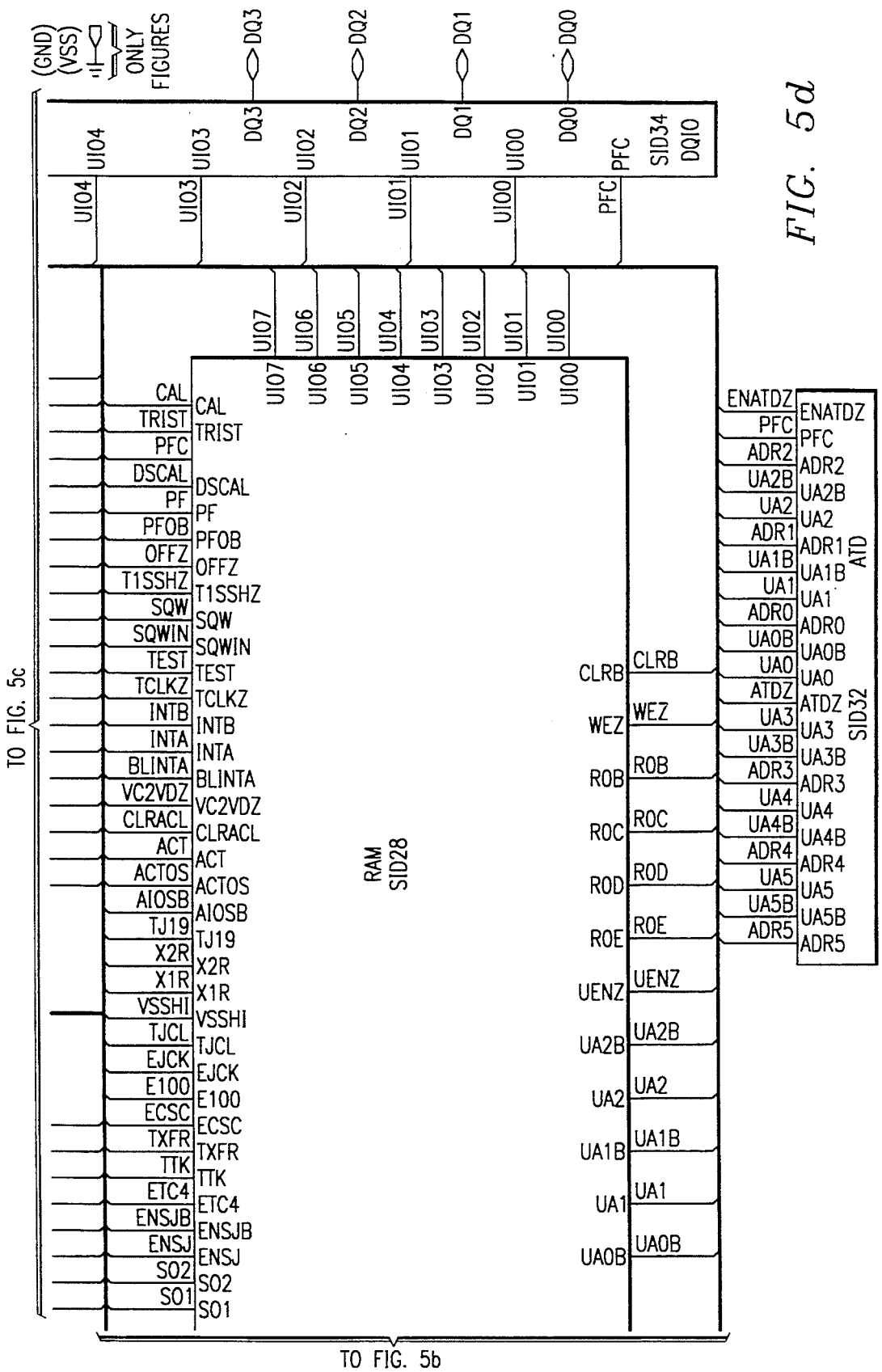

Clock memory 100 is in the write mode whenever the WE (Write Enable) and CE (Chip Enable) signals are in the active (Low) state after the address inputs are stable. The latter occurring falling edge of CE or WE will determine the start of the write cycle. The write cycle is terminated by the earlier rising edge of CE or WE. All address inputs must be kept valid throughout the write cycle. WE must return to the high state for a minimum recovery state ($t_{WR}$) before another cycle can be initiated. Data must be valid on the data bus with sufficient Data Set-Up ($t_{DS}$ and Data Hold Time ($t_{DH}$) with respect to the earlier rising edge of CE or WE. The OE control signal should be kept inactive (High) during write cycles to avoid bus contention. However, if the output bus has been enabled (CE and OE active), then WE will disable the outputs in $t_{ODW}$ from its falling edge. See FIGS. 4b–c. Writes to the external RAM will be considered below.

DATA RETENTION

Clock memory 100 provides full functional capability when Vcc is greater than 4.5 volts and write-protects the register contents at 4.25 volts typical. Data is maintained in the absence of Vcc without any additional support circuitry. The Clock memory 100 constantly monitors Vcc. Should the supply voltage decay, the Clock memory 100 will automatically write-protect itself and all inputs to the registers become Don't Care. The two interrupts INTA and INTB (INTB) and the internal clock and timers continue to run regardless of the level of Vcc. As Vcc falls below approximately 3.0 volts, a power switching circuit turns the internal lithium energy source on to maintain the clock and timer data and functionality. During power-up, when Vcc rises above approximately 3.0 volts, the power switching circuit connects external Vcc and disconnects the internal lithium energy source. Normal operation can resume after Vcc exceeds 4.5 volts for a period of 150 ms.

CLOCK MEMORY REGISTERS

Clock memory 100 has 64 registers 110, 112, 113, 150, and 160 which are eight bits wide that contain all of the timekeeping, alarm, watchdog, control, and on chip data information. The clock, calendar, alarm, and watchdog registers are memory locations which contain external (user-accessible) copies (110, 113, 150, and 160) plus internal copies of the data within internal portions 114, 154, and 164. The external copies are independent of internal functions except that they are updated periodically by the simultaneous transfer of the incremented internal copy (see FIG. 1a). The Command Register 113 bits are affected by both internal and external functions. This register will be discussed later. The external RAM bytes can only be accessed from the external address bus. Registers 0,1,2,4,6,8,9 and A contain time of day and date information (see FIG. 2). Time of day information is stored in BCD. Registers 3,5 and 7 contain the Time of Day Alarm Information. Time of Day Alarm Information is stored in BCD. Register B is the Command Register and information in this register is binary. Registers C and D are the Watchdog Alarm Registers and information which is stored in these two registers is in BCD. Registers E through 3F are user bytes and can be used to maintain data at the user's discretion. Further, the address map continues up to 1FFFF for external attached RAM.

TIME OF DAY REGISTERS

Registers 0,1,2,4,6,8,9 and A contain Time of Day data in BCD. Ten bits within these eight registers are not used and will always read zero regardless of how they are written. Bits 6 and 7 in the Months Register (9) are binary bits. When set to logic zero, EOSC (Bit 7) enables the Real Time Clock oscillator. This bit is set to logic one as shipped from Dallas Semiconductor to prevent lithium energy consumption during storage and shipment. This bit will normally be turned on by the user during device initialization. However, the oscillator can be turned on and off as necessary by setting this bit to the appropriate level. Bit 6 of this same byte controls the Square Wave Output (pin 31). When set to logic zero, the Square Wave Output Pin will output a 1024 Hz Square Wave Signal. When set to logic one the Square Wave Output Pin is in a high impedance state. Bit 6 of the Hours Register is defined as the 12 or 24 Hour Select Bit. When set to logic one, the 12 Hour Format is selected. In the 12 Hour Format, bit 5 is the AM PM bit with logic one being PM. In the 24 Hour Mode, bit 5 is the Second 10 Hour bit (20-23 hours). The Time of Day Registers are updated every 0.01 seconds from the Real Time Clock, except when the TE bit (bit 7 of Register B) is set low or the clock oscillator is not running. The preferred method of synchronizing data access to and from Clock memory 100 is to access the Command Register by doing a write cycle to address location OB and setting the TE bit (Transfer Enable bit) to a logic zero. This will freeze the External Time of Day Registers at the present recorded time, allowing access to occur without danger of simultaneous update. When the watch registers have been read or written, a second write cycle to location OB, setting the TE bit to a logic one, will put the Time of Day Registers back to being updated every 0.01 second. No time is lost in the Real Time Clock because the internal copy of the Time of Day Register buffers is continually incremented while the external memory registers are frozen. An alternate method of reading and writing the Time of Day Registers is to ignore synchronization. However, any single read may give erroneous data as the Real Time Clock may be in the process of updating the external memory registers as data is being read. The internal copies of seconds through years are incremented, and the Time of Day Alarm is checked during the period that hundreds of seconds reads 99 and are transferred to the external register when hundredths of seconds roll from 99 to 00. A way of making sure data is valid is to do multiple reads and compare. Writing the registers can also produce erroneous results for the same reasons. A way of making sure that the write cycle has caused proper update is to do read verifies and re-execute the write cycle if data is not correct. While the possibility of erroneous results from reads and write cycles has been stated, it is worth nothing that the probability of an incorrect result is kept to a minimum due to the redundant structure of the Clock memory 100.

TIME OF DAY ALARM REGISTERS

Figures 3, 4A:
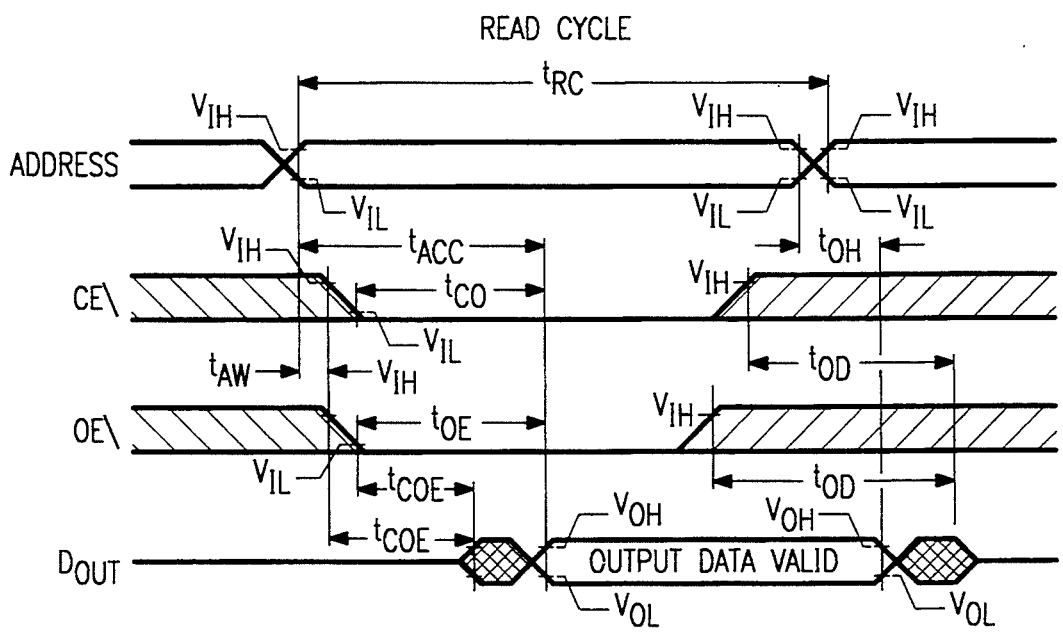
FIG. 3 shows the time of day alarm mask bits of the first preferred embodiment.
FIGS. 4a, 4b, and 4c are timing diagrams for on chip RAM read and write.

Registers 3, 5, and 7 contain the Time of Day Alarm Registers. Bits 3,4,5, and 6 of Register 7 will always read zero regardless of how they are written. Bit 7 of Registers 3,5, and 7 are mask bits (FIG. 3). When all of the mask bits are logic zero a Time of Day Alarm will only occur when Registers 2, 4, and 6 match the values stored in Registers 3,5, and 7. An alarm will be generated every day when bit 7 of Register 7 is set to a logic one. Similarly, an alarm is generated every hour when bit 7 of Registers 7 and 5 is set to logic 1. When bit 7 of Registers 7,5, and 3 is set to a logic 1, an alarm will occur every minute when Register 1 (seconds) rolls from 59 to 00.

Time of Day Alarm Registers are written and read in the same format as the Time of Day Registers. The Time of Day Alarm Flag and Interrupt is always cleared when Alarm Registers are read or written.

WATCHDOG ALARM REGISTERS

Registers C and D contain the time for the Watchdog Alarm. The two registers contain a time count from 00.01 to 99.99 seconds in BCD. The value written into the Watchdog Alarm Registers can be written or read in any order. Any access to Register C or D will cause the Watchdog Alarm to reinitialize and clears the Watchdog Flag Bit and the.

Watchdog Interrupt Output. When a new value is entered or the Watchdog Registers are read, the Watchdog Timer will start counting down from the entered value to zero. When zero is reached, the Watchdog Interrupt Output will go to the active state. The Watchdog Timer Countdown is interrupted and reinitialized back to the entered value every time either of the registers are accessed. In this manner, controlled periodic accesses to the Watchdog Timer can prevent the Watchdog Alarm from ever going to an active level. If access does not occur, countdown alarm will be repetitive. The Watchdog Alarm Registers always read the entered value. The actual countdown register is internal and is not readable. Writing registers C and D to zero will disable the Watchdog Alarm feature.

COMMAND REGISTER

Address location 0B is the Command Register where mask bits, control bits, and flag bits reside. Bit 0 is the Time of Day Alarm Flag (TDF). When this bit is set internally to a logic one, an alarm has occurred. The time of the alarm can be determined by reading the Time of Day Alarm Registers. However, if the transfer enable bit is set to logic zero the Time of Day registers may not reflect the exact time that the alarm occurred. This bit is read only and writing this register has no effect on the bit. The bit is reset when any of the Time of Day Alarm Registers are read. Bit 1 is the Watchdog Alarm Flag (WAF). When this bit is set internally to a logic one, a Watchdog Alarm has occurred. This bit is read only and writing this register has no effect on the bit. The bit is reset when any of the Watchdog Alarm Registers are accessed. Bit 2 of the Command Register contains the Time of Day Alarm Mask Bit (TDM). When this bit is written to a logic one, the Time of Day Alarm Interrupt Output is deactivated regardless of the value of the Time of Day Alarm Flag. When TDM is set to logic zero, the Time of Day Interrupt Output will go to the active state which is determined by bits 0,4,5, and 6 of the Command Register. Bit 3 of the Command Register contains the Watchdog Alarm Mask Bit (WAM). When this bit is written to a logic one, the Watchdog Interrupt Output is deactivated regardless of the value of the Watchdog Alarm Flag. When WAM is set to logic zero, the Watch Dog Interrupt Output will go to the active state which is determined by bits 1, 4, 5, and 6 of the Command Register. These four bits define how Interrupt Output Pins INTA and INT-B (INTB) will be operated. Bit 4 of the Command Register determines whether both interrupts will output a pulse or level when activated. If bit 4 is set to logic one, the pulse mode is selected and INTA will sink current for a minimum of 3 ms and then release. Output INTB (INTB) will either sink or source current for a minimum of 3 ms depending on the level of bit 5. When bit 5 is set to logic one, the B interrupt will source current. When bit 5 is set to logic zero, the B interrupt will sink current. Bit 6 of the Command Register directs which type of interrupt will be present on interrupt pins INTA or INTB (INTB). When set to logic one, INTA becomes the Time of Day Alarm Interrupt pin and INTB (INTB) becomes the Watchdog Interrupt pin. When bit 6 is set to logic zero, the interrupt functions are reversed such that the Time of Day Alarm will be output on INTB (INTB) and the Watchdog Interrupt will be output on INTA. Caution should be exercised when dynamically setting this bit as the interrupts will be reversed even if in an active state. Bit 7 of the Command Register is for Transfer Enable (TE). The function of this bit is described in the Time of Day Registers.

FIG. 1b shows Clock memory 100 controlled by CPU 102 and controlling external RAM 104. The 17-bit address bus 106 and the 8-bit data bus 107 from CPU 102 supply addresses and data to Clock memory 100 and to RAM 104 in parallel. The write enable (WE) output of CPU 102 also connects to Clock memory 100 and to RAM 104 in parallel; contrarily, the output enable (OE) and chip enable (CE) outputs from CPU 102 only connect to Clock memory 100, and Clock memory 100 supplies OER and CEO to the output enable and chip enable inputs of RAM 104. This permits Clock memory 100 to control RAM 104 as described in the following. The power supply input ($V_{CC}$) to RAM 104 also derives from Clock memory 100, thus if the power supply $V_{CCI}$ to Clock memory 100 fails and Clock memory 100 resorts to battery backup (battery at terminal $V_{BAT}$), then Clock memory 100 also supplies battery backup power to RAM 104 and preserves data in memory.

FIGS. 5a, 5b, 5c, and 5d are schematic structural block diagrams of Clock memory 100 which shows the blocks CSRWCTL (chip select read write control), ANALOG (power management), SEQNCR (sequencer), CNTDN (count down), ALU (arithmetic logic unit), RAM (64 bytes including the RAMs and portions 110, 112, 113, 114, 150, 154, 160, and 164), DQIO (data input/output buffers), ATD (address transition detection), a bus interconnecting these blocks and the terminals ADR0-ADR5 and AR6-AR16 (same as A0-A16 in FIG. 1b), DQ0-DQ7 (same as D0-D7), X1-X2, GND, VCCI, VCCO, BAT1-BAT2 (VBAT1-VBAT2), PFOB, SQW, INTA, INTB, OSCAL, CEB, CEOB, OEB, OERMB, and WEB. Note that an overline in FIG. 1b is translated as a suffix "B" in FIGS. 5a, 5b, 5c, and 5d. The circuitry that deciphers a 17-bit address on ADR0-AR16 and decides whether to interpret the address as an access to the 64 bytes in block RAM or as an access to external RAM 104 resides in block CSRWCTL which is shown in FIG. 6.

Figure 6:
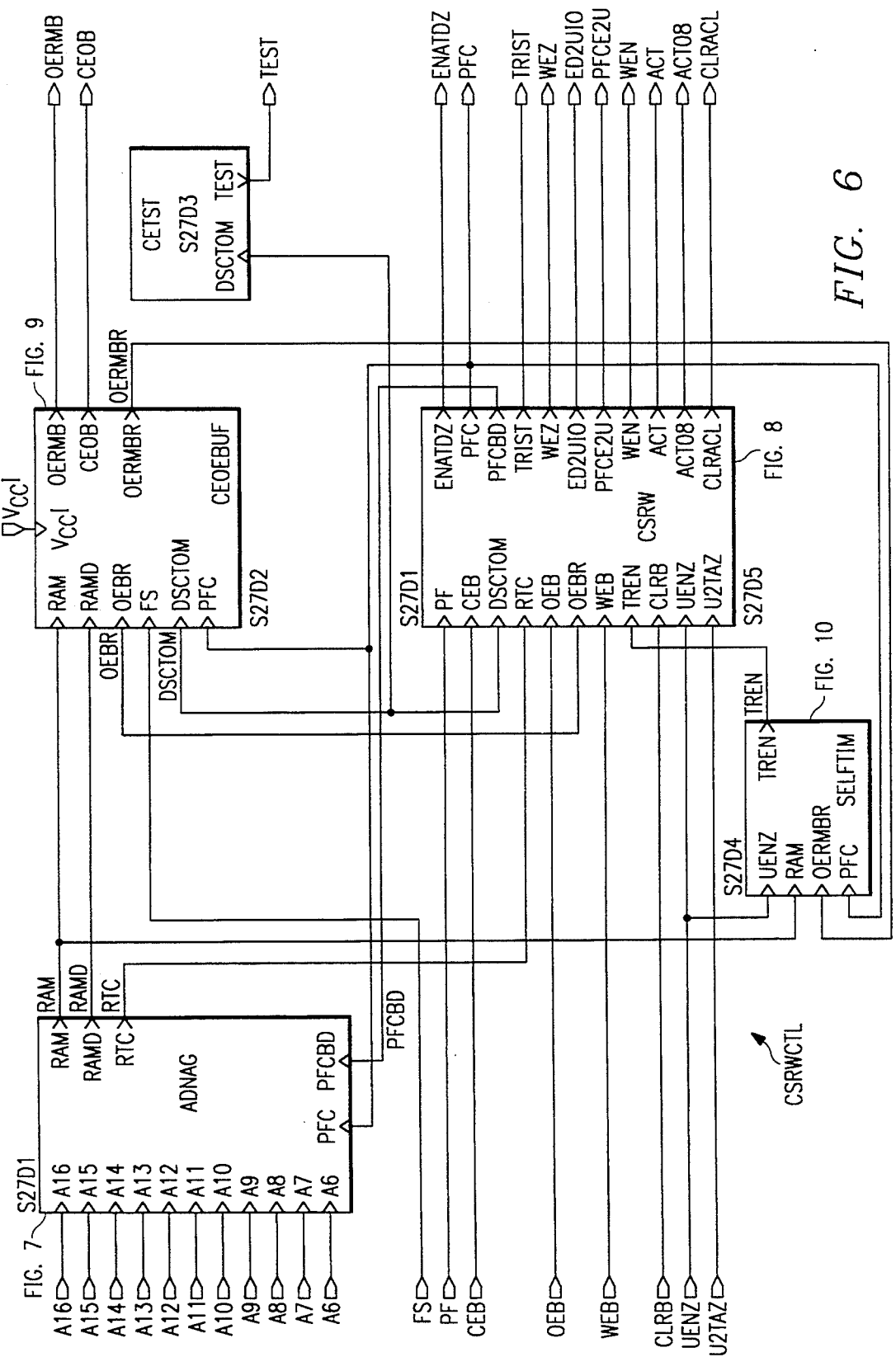

FIG. 6 shows block CSRWCTL is made of subblocks ADMAG (address magnitude), CEOEBUF (chip enable output enable buffer), CETST (chip enable test), CSRW (chip select read write), and SELFTIM (self-timing); and these subblocks are illustrated in FIGS. 7-10 except for subblock CETST which is a chip enable test circuit and not part of the memory addressing operation.

Figure 7:
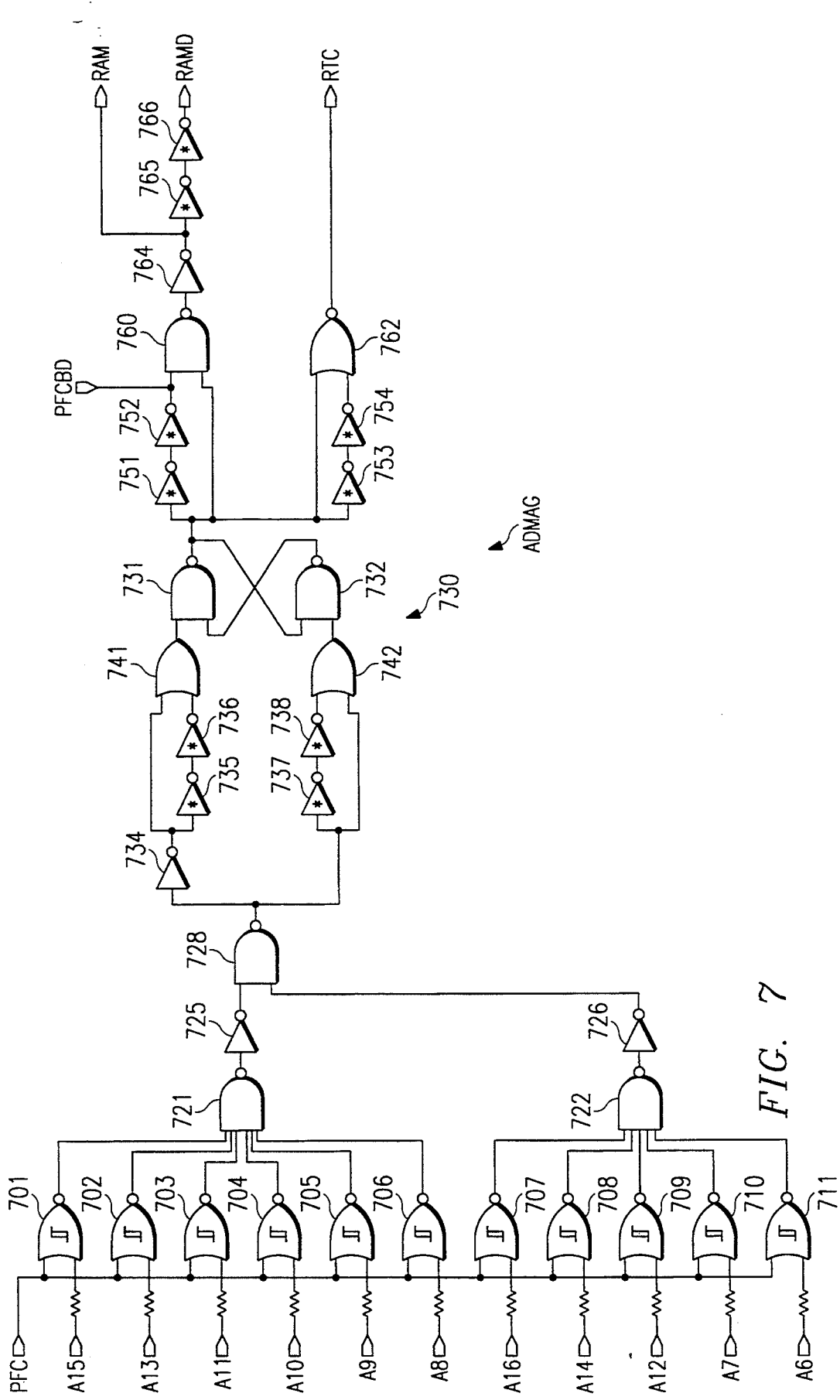

The memory read write operation of Clock memory 100 plus RAM 104 includes the preferred embodiment address mapping as follows: CPU 102 puts a 17-bit address on lines A0-A16 (FIG. 1b) and this address enters RAM 104 terminals A0-A16 and Clock memory 100 terminals ADR0-AR16 (FIGS. 5a, 5b, 5c, and 5d). The upper eleven bits AR6-AR16 enter block CSRWCTL and its subblock ADMAG at nodes A6-A16 (FIGS. 5a, 5b, 5c, and 5d, 6, and 7). As shown in FIG. 7, each of the eleven address bits is NORd with the PFC signal (which is high only if there is a power fail condition or if PIN CEB is HIGH) in NOR gates 701-711 and the outputs of the NOR gates are NANDed together by NAND gates 721 and 722, inverters 725 and 726, and NAND gate 728. Thus the output of NAND gate 728 is high if and only if at least one of the eleven address bits is high (or if PFC is high). An address with at least one of the eleven address bits high corresponds to an address for external RAM 104, so the output of NAND gate 728 high indicates an external RAM 104 address from CPU 102. Conversely, a low output of NAND gate 728 indicates an address from CPU 102 for one of the 64 bytes of RAM integrated in Clock memory 100. Note that NOR gates 701-711 have an input hysteresis of about 300 millivolts for the address bit inputs and that 2K resistor are in series with the NOR gate inputs which leads to an RC time constant delay of about 0.25 nanosecond (nsec).

The output of NAND gate 728 drives latch 730 formed by cross coupled NAND gates 731-732 through inverters 734-738 and OR gates 741-742. Inverters 735-736 plus OR gate 741 will pass a low-to-high transition but will delay a high-to-low transition, and inverters 737-738 plus OR gate 742 do the same. These delays are about 3 nsec. Thus a short duration pulse (either low-to-high-to-low or high-to-low-to-high) in the output of NAND gate 728 will not switch latch 730 due to these delays; this provides noise suppression. Otherwise, the output of latch 730 tracks the output of NAND gate 728 but with this delay of 3 nsec.

The output of latch 730 is delayed 6 nsec by inverters 751 and 752 and then is input to NAND gate 760 together with PFCBD (a delayed complement of the PFC signal and thus low only if there is a power failure or PIN CEB is HIGH). The output of NAND gate 760 is inverted by inverter 764 and output at node RAM, plus is delayed 15 nsec by inverters 765-766 and output at node RAMD. Thus the signal at node RAM tracks the output of latch 730 with a delay and thus also tracks the output of NAND gate 728 (except for short duration pulses) with a delay of about 24 nsec.

The output of latch 730 is also directed to NOR gate 762 plus delayed by inverters 753-754 and directed to the other input of NOR gate 762. The output of NOR gate 762 appears at node RTC and goes high with a delay of about 12 nsec after latch 730 goes low, and NOR gate 762 is low if latch 730 is high.

Figure 11:
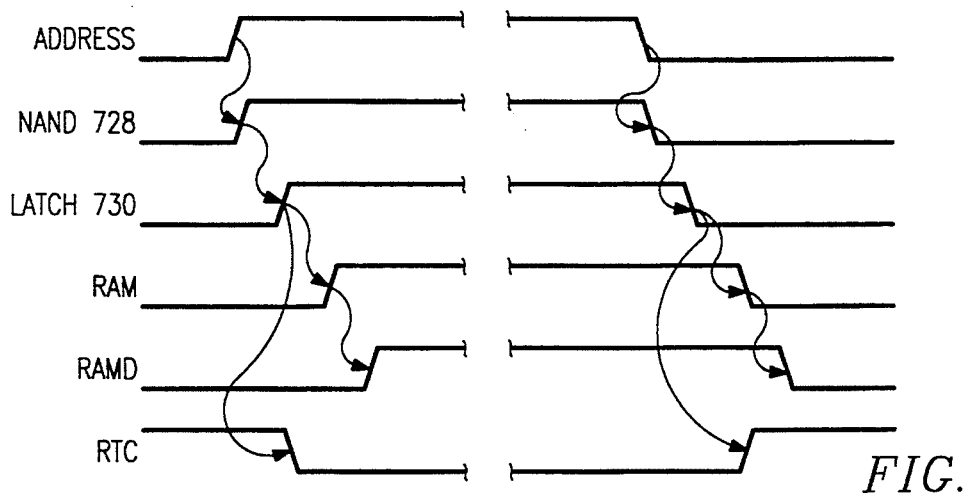
FIGS. 11 through 13 are timing diagrams.

The outputs of subblock ADMAG under normal operating conditions (no power failure) appear in timing diagram FIG. 11 where the line labelled "Address" shows the OR of the eleven bits A6–A16. Note that node RTC switches prior to nodes RAM and RAMD for a low-to-high address transition (that is, a change from an on chip RAM address to an external RAM address). When CPU 102 is changing addresses, latch 730 and inverters 735-738 and 751-754 suppress glitches caused by differences in the transition times and propagation delays of addresses A6–A16.

Figure 8:
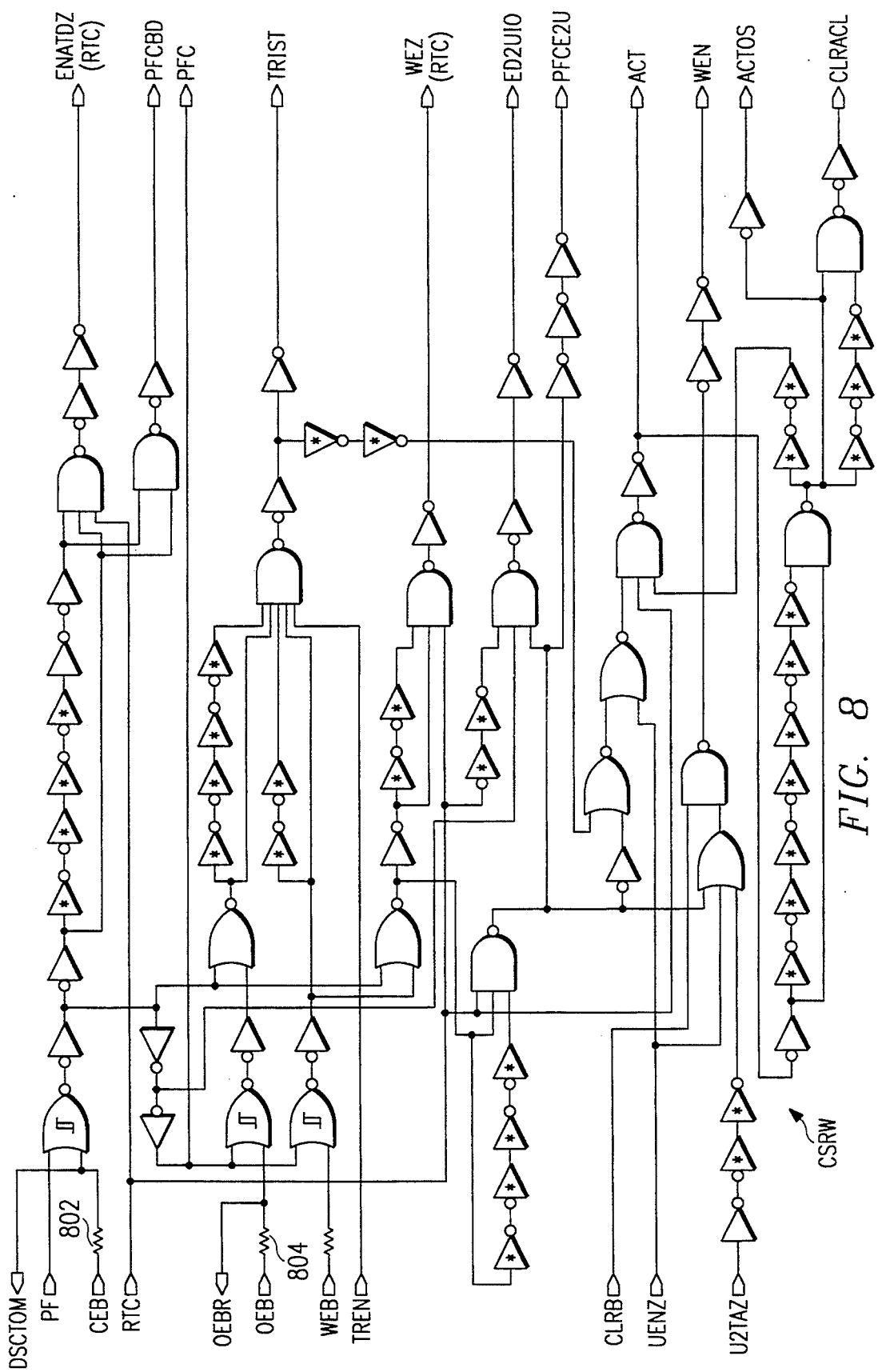

Subblock CSRW shown schematically in FIG. 8 receives the node RTC output from subblock ADMAG and also the Clock memory 100 inputs CEB (chip enable), WEB (write enable), and OEB (output (read) enable) from CPU 102. Subblock CSRW passes the CEB and OEB signals through 2K resistors and then out to subblock CEOEBUF which generate the CEOB (chip enable output) and OERMB (output enable for external RAM) outputs that permit Clock memory 100 to control external RAM 104. Note that the signal at input node CEB changes its name to the signal at output node DSCTOM after passing through the 2K resistor 802, and that the signal at input node OEB passes through 2K resistor 804 and emerges at output node OEBR. Subblock CSRW together with subblock SELFTIM also controls the on chip RAM of Clock memory 100 as described below.

Subblock CEOEBUF (chip enable, output enable buffer), illustrated schematically in FIG. 9, receives the node RAM and RAMD signals from subblock ADMAG and the node OEBR and DSCTOM (CEBR) signals from subblock CSRW and operates as follows. First, presume that PFC (power fail) is low and that FS (freshness seal signal: kills battery power to RAM if FS=1) is also low. Then the signal at node DSCTOM (CEBR) is inverted by NOR gates 902 and 904 and inverter 906 and is buffered by inverters 907–910 to drive output inverter 911 to node CEOB. (Alternatively, the PF signal rather than the delayed version PFC can be input to NOR gate 902 to avoid delay in response to CEB falling.) Inverter 911 has p-channel and n-channel FETs with large gate width to length ratios to drive external RAM 104 input CE which may be some distance from Clock memory 100. Thus Clock memory 100 has a net effect on the CE signal from CPU 102 of gating it with the PFC and FS signals and then transmitting it to external RAM 104.

Subblock CEOEBUF gates the OE signal from CPU 102 with the signals of both PFC and the nodes RAM and RAMD of subblock ADMAG before transmitting it to external RAM 104. In particular, again presume that PFC (power fail) is low. Then the signal at node OEBR is inverted by NOR gate 922 and fed to three-input NAND gate 924. The other inputs to NAND gate 924 are the signals on nodes RAM and RAMD, so NAND gate 924 is held high if either node RAM or RAMD is low regardless of OEBR. Contrarily, if RAM and RAMD are both high, then OEBR is inverted by inverter 926 and is buffered by inverters 927–930 to drive output inverter 931 to node OERMB. Inverter 931 has p-channel and n-channel FETs with large gate width to length ratios to drive external RAM 104 input OE which may be some distance from Clock memory 100. Thus Clock memory 100 has a net effect on the OE signal from CPU 102 of gating it with the PFC and RAM/RAMD signals and then transmitting it to external RAM 104. Thus if RAM/RAMD are low, as for an access to the on chip RAM of Clock memory 100, then the OE signal from CPU 102 is stopped at NAND gate 924 and the OERMB output of Clock memory 100 is a constant high fed to the OE input of external RAM 104. Thus external RAM 104 is not accessed for a read of any addresses 00000 through 0003F. Recall that for a write the write enable (WE signal from CPU 102 directly drives external RAM 104, so a write to any address in external RAM 104 occurs without disturbance from Clock memory 100, including addresses in the range 00000 through 0003F. Of course, the writes to these low order addresses also write to on chip RAM of Clock memory 100, so such addresses should not be readable from external RAM 104 but only from on chip RAM.

Figure 12:
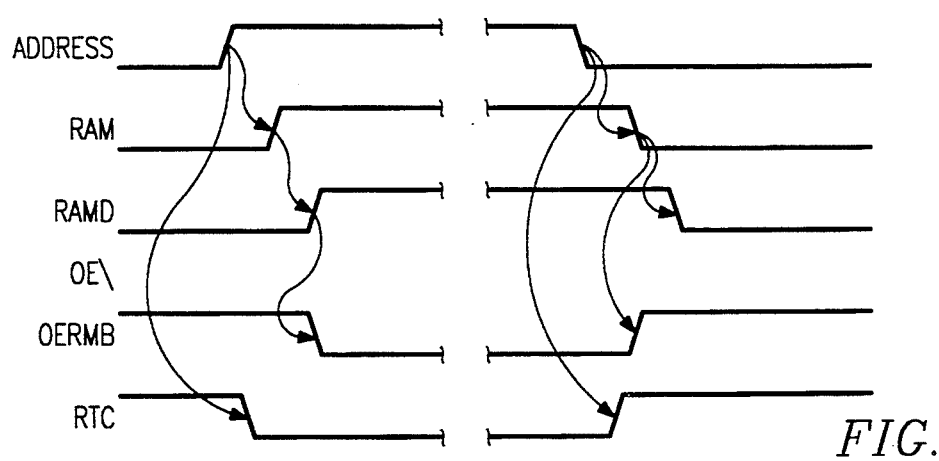

When CPU 102 reads from external RAM 104 and then immediately follows this with a read from the on chip RAM of Clock memory 100, the timing becomes a problem because the output drivers of external RAM 104 must be turned off before the output drivers of the on chip RAM are turned on. Indeed, FIG. 12 illustrates the timing presuming that CPU 102 just holds OE low for successive reads. As in FIG. 11, Address is the OR of the eleven high order address bits A6–A16. The external RAM 104 output drivers are turned off when OERMB goes high which follows node RAM going low with minimal delay (about 10 nsec). Of course, the external RAM 104 drivers take some time to fully turn off, so the output drivers of the on chip RAM of Clock memory 100 are turned on after a delay period of about 50 nsec after OERMB goes high.

Figure 13:
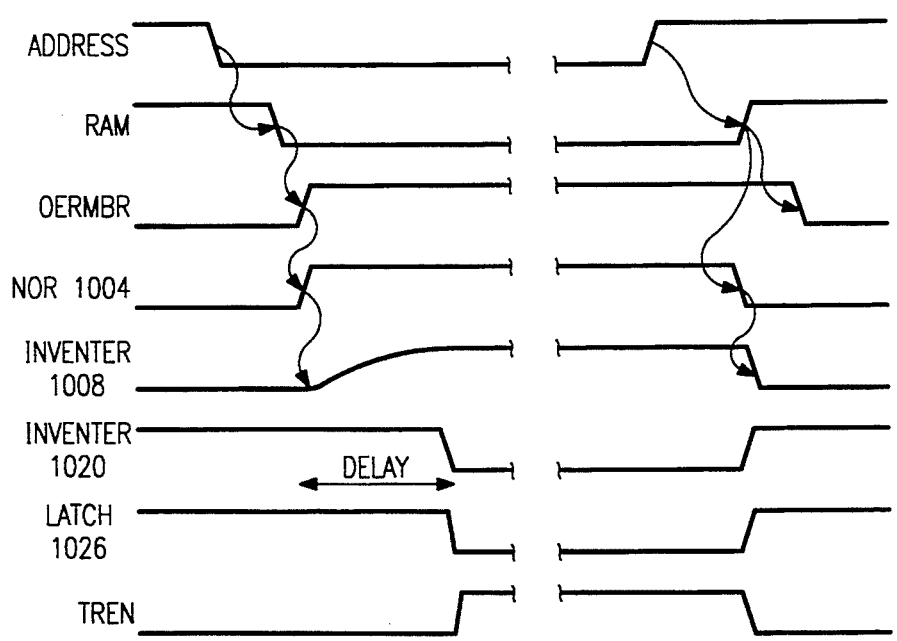

Subblock SELFTIM (FIG. 10) generates the turn on delay for the output drivers of the on chip RAM of clock memory 100 as follows. Again, presume that PFC is low (no power failure). NOR gate 1002 inverts the signal at node OERMBR (which is the same as OERMB with a series 4K resistor 950 as shown in FIG. 9) and feeds the inverted signal to NOR gate 1004. The other input to NOR gate 1004 is the signal at node RAM, so the output of NOR gate 1004 goes high when OERMB goes high and RAM is low and returns low when RAM goes high; see FIG. 13. The output of NOR gate 1004 is inverted by inverter 1006 and this drives inverter 1008 which has a 10K resistor 1010 in series with the p-channel and n-channel FETs. The output of inverter 1008 connects to capacitors 1011–1014 and the input of inverter 1020. Capacitors 1011–1014 provide a capacitance of about 4 pF and thus a time constant of about 40 nsec for inverter 1008 to switch from low to high. See FIG. 13 which shows the voltage on the output node of inverter 1008 and the output of inverter 1020 which is delayed about 45 nsec relative to OERMBR; this delay permits the output drivers of external RAM to turn off prior to activation of the output drivers of Clock memory 100. Inverter 1020 provides some input hysteresis. The output of inverter 1020 is inverted twice by NOR gate 1022 (presuming that UENZ is low) plus inverter 1024 and then becomes one of the inputs to latch 1026 formed by cross coupled NAND gates. The other input of latch 1026 is an inversion by NOR gate 1028 of the signal on node RAM. The inverted ouput of latch 1026 is the signal at node TREN and is shown in FIG. 13.

FIG. 8 illustrates the propagation of the signal at node TREN to hold node TRIST (tristate) high until TREN goes high allowing node TRIST to go low, which allows the output buffers of Clock memory 100 to turn on, as described in connection with FIG. 15. This assumes nodes OED, CO, WZD, and WZ have had sufficient time to reach a logic high level; OED and CO will be high some time after OEB goes low. WZD and WZ are high when WEB is high.

Figures 14, 15:
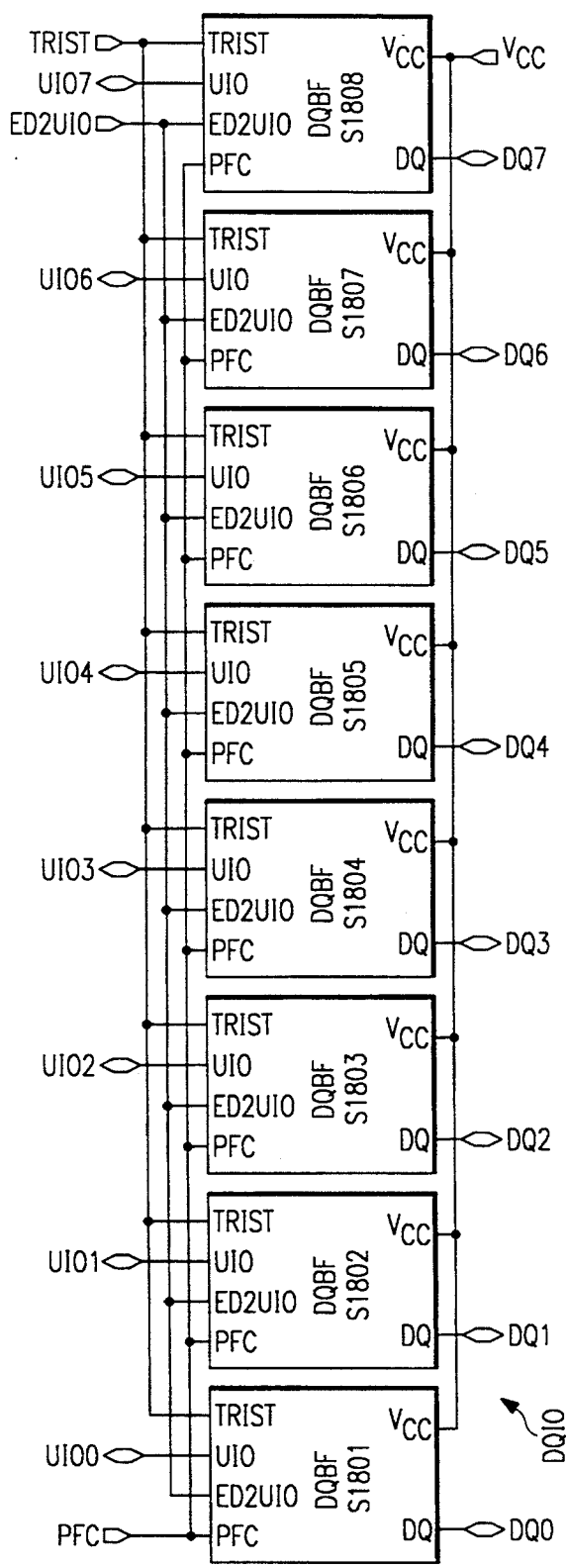
FIG. 14 is a block diagram of the input/output driver section of the first preferred embodiment.
FIG. 15 is a schematic circuit diagram of the blocks of FIG. 14.

FIG. 14 shows block DQIO (data input/output buffers) which is made of eight buffers DQBF. FIG. 15 illustrates buffer DQBF which includes p-channel FET 1502 and n-channel FET 1504 forming the output driver, NAND gate 1506, NOR gates 1508–1509, inverters 1511–1520, transmission gate 1522, 4KΩ resistor 1524, and nodes UIO (internal data line), DQ (external data line), VCC (power supply), TRIST (tristate), PFC (power failure), ED2UIO (high for a data input and low for a data output), and ground.

For data input from DQ to UIO, transmission gate 1522 is conducting (ED2UIO is high) and so signals at DQ propagate through NOR gate 1509 (provided PFC is low) and inverters 1511–1515 to node UIO. TRIST must also be high to set NAND gate 1506 high and NOR gate 1508 low to prevent feedback from node UIO back to node DQ. NAND gate 1506 high turns off n-channel output driver FET 1504, and NOR gate 1508 low turns off p-channel output driver FET 1502.

Conversely, for data output from UIO to DQ, transmission gate 1522 is nonconducting (ED2UIO low) and TRIST is low. Thus signals on node UIO are inverted by inverter 1517, inverted again by NAND gate 1506 and NOR gate 1508, and inverted a third time by inverters 1519 and 1520 and fed to the gates of FETs 1502 and 1504. Thus a high on UIO yields a low on the FET gates, so p-channel output driver FET 1502 is turned on and n-channel output driver FET 1504 is turned off and node DQ is driven up to VCC. Similarly, a low at UIO turns off p-channel FET 1502 and turns on n-channel FET 1504 to drive node DQ to ground.

Lastly, if ED2UIO is low and TRIST is high, then the output drivers 1502 and 1504 are both off and any signals on node DQ are stopped by transmission gate 1522. Access to external RAM 104 uses this high impedance state for node DQ of the on chip RAM.

The case of CPU 102 switching from an address in on chip RAM of Clock memory 100 to an address in RAM 104 analogously requires the on chip RAM output drivers be turned off prior to the RAM 104 output drivers being turned on. The delay of the signal at node RAMD from that at node RAM provides such delay, and this controls RAM 104 through the OERMB output enable signal to the OE input of RAM 104. See the lefthand portion of FIG. 12.

Modifications and Variations

Various modifications of the preferred embodiments may be made while retaining the features of contiguous address mapping for the two memories with delay on read if crossing the address map boundary. Indeed, the address space in the larger memory occupied by the smaller memory may be scattered among the bits and the complementary bits need not all be zero; for example, with 17 bit addresses in the larger memory and 6 bit addresses in the smaller memory, all addresses of the form 0xx1 0x00 111x 0xx1 1 could be the addresses for the smaller memory and the detect circuitry for larger memory addresses would involve complements. Both memories could have nonoverlapping address space portions plus a common overlapping portion. Further, the selftiming circuit SELFTIM (FIG. 10) has signals RAM low and OERMBR high in order to start the timed delay; this could be changed to simply use the RAM signal alone with potentially a longer delay time. Also, the delay time in the selftiming circuit could be made electrically programmable for use with different speed-grade RAMs. In fact, the selftiming circuit could use delays generated by gate-delays, current source charging/discharging a capacitance, and so forth in place of the RC delay of the preferred embodiment.

Further, various size RAMs or even multiple RAMs could be used with differently decoded OERMB signals to each RAM. And signal CEO could be decoded in addition to or in place of OERMB. And signal WE could be decoded in a similar way as signal OE to OERMB and output to the RAM in addition to OERMB.

External RAM may be replaced with ROM. In the preferred embodiments this would give the user 64 bytes of RAM and the remainder of the address space as ROM.

What is claimed is:

1. A memory control system, comprising:
   (a) a first memory with at least one first address, wherein said first address(es) have K number of bits;
   (b) a second memory with at least one second address, wherein said second address(es) have N number of bits, and wherein N is greater than K;
   (c) an address bus to carry address(es) having N bits, said address bus connected to said first and second memories with said first memory connected to receive a subset of size K number of bits of the N number of bits bits of said address bus:
   (d) detect circuitry connected to receive (N−K) number of bits from said address bus which are exclusive of said subset of size K; and
   (e) delay circuitry coupled to said first memory and said detect circuitry, said delay circuitry creates a first delay to delay output of said first memory when said detect circuitry indicates that said (N−K) number of bits on said address bus have changed from a portion of an address outside of said first memory to a portion of an address in said first memory, said first delay occurring only in conjunction with said (N−K) number of bits on said address bus having changed from said portion of said address outside said first memory to said portion of said address in said first memory.

2. The memory control system of claim 1, further comprising:
   (a) second delay circuitry coupled to said second memory and said detect circuitry, said second delay circuitry creates a second delay to delay output of said second memory when said detect circuitry indicates that said (N−K) number of bits on said address bus have changed from a second portion of a second address in said first memory to a second portion of a second address outside of said first memory, said second delay occurring only in conjunction with said (N−K) number of bits on said address bus having changed from said second portion of said second address outside said first memory to said second portion of said second address in said first memory.

3. The memory control system of claim 1, further comprising circuitry for inhibiting access to said second memory:
   when said (N−K) bits are a portion of an address in said first memory.

4. The memory control system of claim 1, wherein:
   (a) N equals 17;
   (b) K equals 6;
   (c) said subset of (N−K) number of bits are all 0 for an address in said first memory.

5. The memory control system of claim 1, wherein:
   (a) an output enable signal to said second memory corresponds to an output enable signal to said first memory and to an output from said detect circuitry.

6. The memory control system of claim 5, wherein:
   (a) a write signal from outside said memory control system is applied simultaneously to said first and second memories.

7. A memory control system, comprising:
   (a) a first memory with an address space;
   (b) a second memory with an address space, a first portion of said address space of said first memory overlapping a second portion of said address space of said second memory;
   (c) control circuitry that permits write access to said first portion of said address space of said first memory and said second portion of said address space of said second memory, said control circuitry permits read access to said first portion of said address space of said first memory and does not permit read access to said second portion of said address space of said second memory; and (d) said control circuitry creates a delay to delay output of said first memory when read access for said first portion of said address space of said first memory is requested after read access for said address space of said second memory which is outside of said second portion of said address space of said second memory, said delay occurs only when read access for said first portion of said address space of said first memory is requested after read access for said address space of said second memory which is outside of said second portion of said address space of said second memory.

8. The memory control system of claim 7, wherein:
(a) said first delay has an adjustable delay range.

9. A method of memory address mapping, comprising the steps of:
(a) providing addresses having N number of bits;
(b) partitioning said addresses having N number of bits into subsets of K number of bits and (N−K) number of bits;
(c) coupling read request addresses having a first sequence of bits in said subset of size K with a first memory;
(d) coupling read request addresses having a second sequence of bits in said subset of size (N−K) number of bits differing from said first sequence of bits with a second memory that is different from said first memory memory, and
(e) creating a first delay to delay output of said first memory when read request address for said first sequences of bits differs from said second sequence of bits.

10. The method of claim 9, wherein:
(a) said first memory is a $2^K$ number of bits memory; and
(b) said second memory is a $2^N$ number of bits memory.

11. The method of claim 9, wherein said first sequence of bits and said second sequence of bits are fixed.

12. The method of claim 9, wherein said first sequence of bits and said second sequence of bits are preselected.

13. The memory control system of claim 1, wherein said first and second memories are random access memories.

14. The memory control system of claim 1, wherein said detect circuitry and delay circuitry are different from one another.

15. The memory control system of claim 1, wherein said (N−K) number of bits on said bus asynchronously change from a portion of an address in said first memory to a portion of an address outside of said first memory.

16. The memory control system of claim 7, wherein said first and second memories are nonvolatile registers.

17. The memory control system of claim 7, wherein said first memory is internal memory and said second memory is external memory.

18. The memory control system of claim 7, wherein a timekeeping information is stored in said first portion of said address space of said first memory that overlaps said second portion of said address space of said second memory.

19. The memory control system of claim 7, wherein said control circuitry is controlled by said address of said address space of said first memory and said address space of said second memory.

20. The memory control system of claim 19, wherein said control circuitry is controlled by said address of said address space of said first memory and said address space of said second memory, wherein said address of said address space of said first memory and said address space of said second memory are externally controlled by a user.

* * * * *